US012757106B2

(12) United States Patent
Frenger et al.

(10) Patent No.: US 12,757,106 B2
(45) Date of Patent: *Oct. 6, 2026

(54) TRANSMISSION AND RECEPTION OF SYSTEM INFORMATION IN PARTS

(71) Applicant: Telefonaktiebolaget LM Ericsson (publ), Stockholm (SE)

(72) Inventors: Pål Frenger, Linköping (SE); Martin Hessler, Linköping (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1122 days.

This patent is subject to a terminal disclaimer.

(21) Appl. No.: 17/720,788

(22) Filed: Apr. 14, 2022

(65) Prior Publication Data

US 2022/0240169 A1 Jul. 28, 2022

Related U.S. Application Data

(63) Continuation of application No. 15/036,283, filed as application No. PCT/SE2016/050310 on Apr. 12, 2016, now Pat. No. 11,317,342.

(51) Int. Cl.
*H04W 72/04* (2023.01)
*H04L 25/03* (2006.01)
(Continued)

(52) U.S. Cl.
CPC ....... *H04W 48/16* (2013.01); *H04L 25/03866* (2013.01); *H04W 48/08* (2013.01); *H04W 72/04* (2013.01)

(58) Field of Classification Search
CPC ..... H04W 48/16; H04W 48/08; H04W 72/04; H04L 25/03872; H04L 25/03866
See application file for complete search history.

(56) References Cited

U.S. PATENT DOCUMENTS 11,317,342 B2 * 4/2022 Frenger ................. H04W 48/12
2012/0327895 A1 12/2012 Wallen et al.
(Continued)

FOREIGN PATENT DOCUMENTS

CN 102461269 A 5/2012
CN 103621147 A 3/2014
(Continued)

OTHER PUBLICATIONS

Frenger, Pål , et al., "A Clean Slate Radio Network Designed for Maximum Energy Performance", 2014 IEEE 25th Annual International Symposium on Personal, Indoor, and Mobile Radio Communication (PIMRC), Sep. 2, 2014, 1300-1304.
(Continued)

*Primary Examiner* — Yuwen Pan
*Assistant Examiner* — Farideh Madani
(74) *Attorney, Agent, or Firm* — Murphy, Bilak & Homiller, PLLC

(57) ABSTRACT

A radio node (12) is configured for use in a wireless communication system (10) in which system information is transmitted in parts. The radio node (12) in this regard generates explicit signaling that is associated with a first part (16) of system information and that indicates a sequence (24) with which a second part (20) of system information is to be demodulated or descrambled. The radio node (12) transmits the explicit signaling over a signaling channel (25). Correspondingly, a wireless communication device (14) receives system information for the system (10) in parts. The device (14) receives the first part (16) over the first channel (18). The device (14) also receives the explicit signaling over the signaling channel (25). The device (14) further receives the second part (20) over the second channel (22), by demodulating or descrambling the second part (20) using the sequence (24) indicated by the explicit signaling.

24 Claims, 10 Drawing Sheets

(51) Int. Cl.

*H04W 48/08* (2009.01)
*H04W 48/16* (2009.01)

(56) References Cited

U.S. PATENT DOCUMENTS

| | | | | |
|---|---|---|---|---|
| 2013/0083746 | A1 | 4/2013 | Nazar et al. | |
| 2013/0301524 | A1 | 11/2013 | Xu et al. | |
| 2014/0185495 | A1 | 7/2014 | Kuchibhotla et al. | |
| 2014/0295836 | A1* | 10/2014 | Frenger | H04W 48/08 455/434 |
| 2014/0307621 | A1 | 10/2014 | Frenger et al. | |
| 2014/0315549 | A1* | 10/2014 | Zhang | H04W 48/10 455/434 |
| 2014/0321421 | A1 | 10/2014 | Popovic et al. | |
| 2015/0050939 | A1 | 2/2015 | Futaki et al. | |
| 2015/0085717 | A1 | 3/2015 | Papasakellariou et al. | |
| 2015/0099528 | A1 | 4/2015 | Hu et al. | |
| 2015/0304080 | A1 | 10/2015 | Yi et al. | |
| 2015/0318968 | A1* | 11/2015 | Kim | H04B 7/2656 370/329 |
| 2016/0057562 | A1* | 2/2016 | Fang | H04L 1/0045 370/329 |
| 2017/0280454 | A1* | 9/2017 | Kusashima | H04W 28/04 |

FOREIGN PATENT DOCUMENTS

| | | | | |
|---|---|---|---|---|
| CN | 104105138 | A | 10/2014 | |
| CN | 104380805 | A | 2/2015 | |
| CN | 104486056 | A | 4/2015 | |
| CN | 104955164 | A | 9/2015 | |
| CN | 106209331 | A | 12/2016 | |
| JP | 2009278659 | A | 11/2009 | |
| JP | 2014526160 | A | 10/2014 | |
| JP | 2015509320 | A | 3/2015 | |
| JP | 2015522975 | A | 8/2015 | |
| KR | 20150085717 | A | 7/2015 | |
| RU | 2536345 | C2 | 12/2014 | |
| WO | 2009156765 | A1 | 12/2009 | |
| WO | 2013000818 | A1 | 1/2013 | |
| WO | 2013104425 | A1 | 7/2013 | |
| WO | 2013140437 | A1 | 9/2013 | |
| WO | WO-2014106322 | A1 * | 7/2014 | H04L 5/005 |
| WO | 2015089764 | A1 | 6/2015 | |
| WO | 2016053155 | A1 | 4/2016 | |

OTHER PUBLICATIONS

Unknown, Author , "5G—Key Component of the Networked Society", RWS-150009, 3GPP RAN Workshop on 5G, Phoenix, Arizona, USA, Sep. 17-18, 2015, 1-55.

Unknown, Author , "On MTC SIB transmission", 3GPP TSG RAN WG1 Meeting #83; R1-156917; Anaheim, USA, Nov. 15-22, 2015, pp. 1-4.

Unknown, Author , "SIB-1 Scheduling for Low Cost UEs", 3GPP TSG RAN WG1 #81; R1-152842; Fukuoka, Japan, May 25-29, 2015, pp. 1-3.

Unknown, Author , "System Information requirements and scheduling", 3GPP TSG-RAN WG2 Meeting #56bis, R2-070108, Sorrento, Italy, Jan. 15-19, 2007, pp. 1-5.

Unknown, Author , "Transmission of dynamic system information", TSG-RAN2 #58bis; R2-072543; Orlando, FL, Jun. 25-29, 2007, pp. 1-4.

* cited by examiner

TRANSMISSION AND RECEPTION OF SYSTEM INFORMATION IN PARTS

TECHNICAL FIELD

The present application relates generally to system information for a wireless communication system, and particularly to transmission and reception of that system information in parts.

BACKGROUND

A wireless communication system transmits system information to wireless communication devices within the system's coverage area. This system information includes for example access information indicating how wireless communication devices may access the system, e.g., initially via random access. The access information may specify for instance parameters that indicate control the timing, frequency, transmission formats, and/or power used by a device for initial access.

Traditionally, a wireless communication system broadcasts cell-specific system information from each of the system's cells. This allows different system information to be broadcast from different cells, e.g., to be able to distinguish between accesses made in different cells, or to adjust initial transmission power levels on a cell-specific basis.

Especially as wireless communication systems densify, though, broadcasting system information using this traditional approach proves inefficient and costly in terms of radio resources and energy. Modern approaches therefore seek to minimize the amount of system information that is broadcast, and to limit how often that information is broadcast. Some approaches for example broadcast a table of limited system information relatively infrequently, and broadcast an index into that table relatively frequently. See, e.g., U.S. Patent. Publ. No. 2014/0295836, which is incorporated by reference herein. In these and other approaches, challenges still exist in efficiently distributing system information to wireless communication devices.

SUMMARY

According to one or more embodiments herein, a wireless communication device receives system information for a wireless communication system in parts. The wireless communication device is configured to receive, over a first channel, a first part of system information. The device is also configured to receive, over a signaling channel, explicit signaling that is associated with the first part and that indicates a sequence with which the wireless communication device is to demodulate or descramble a second part of system information. An indicated sequence may be for instance a demodulation reference signal (DMRS) sequence, a scrambling code sequence, and/or a synchronization signal sequence. Regardless, the wireless communication device is also configured to receive the second part of system information over a second channel, by demodulating or descrambling the second part using the indicated sequence. In some embodiments, the wireless communication device is further configured to access the system using both the first and second parts of system information.

In one or more embodiments, the second part of system information includes an access information table containing multiple configurations for accessing the wireless communication system. The multiple configurations are respectively indexed by different indices. In this case, the wireless communication device may be configured to receive a so-called system signature signal indicating one of multiple different possible system signatures for the wireless communication system. The device is further configured to receive the first part of system information based on the system signature signal, as well as to determine an index into the access information table included in the second part of system information, based on the system signature signal. Moreover, the device is configured to access the wireless communication system using a configuration indexed in the access information table by the determined index.

Still other embodiments herein include a radio node configured for use in a wireless communication system (10) in which system information is transmitted in parts. The radio node is configured to generate explicit signaling that is associated with a first part of system information and that indicates a sequence with which a second part of system information is to be demodulated or descrambled. The radio node is also configured to transmit the explicit signaling over a signaling channel.

In any of these embodiments, the explicit signaling may be included in the first part of system information and is transmitted over the same channel as the first part of system information. That is, in this case, the first channel may be the same as the signaling channel. Alternatively, the explicit signaling may be excluded from the first part 16 of system information. In this case, the explicit signaling may nonetheless be configured to be demodulated based on the same sequence with which the first part 16 of system information is configured to be demodulated.

In any of these embodiments, the first part of system information may be demodulated or descrambled using a different sequence than that with which the second part of system information may be demodulated or descrambled.

Furthermore, in some embodiments, the sequence indicated by the explicit signaling distinguishes the second part of system information from one or more other second parts of system information that are receivable using one or more other respective sequences for demodulating or descrambling.

Alternatively or additionally, multiple different possible second parts of system information may each include a type of table accessible using an index obtained by the wireless communication device. In this case, the sequence indicated by the explicit signaling may distinguish the second part of system information as including the table of that type targeted by the index. In this case, the type of table may be an access information table which contains multiple configurations for accessing the wireless communication system, where the multiple configurations are respectively indexed by different indices.

In some embodiments, the second part of system information may comprise a common access information table, C-AIT, that includes multiple access information configurations respectively indexed by different system signature indices, SSIs. In this case, one or more of the access information configurations may be a configuration for initially accessing the wireless communication system. The first part of system information may comprise a system signature block, SSB, that is associated with an SSI.

In any of the above embodiments, the explicit signaling may indicate a demodulation reference signal sequence. The explicit signaling may alternatively or additionally indicate a scrambling code sequence. In still other embodiments, the explicit signaling may alternatively or additionally indicate a synchronization signal sequence.

In some embodiments, the explicit signaling further indicates one or more of: information about a resource size in the time domain and/or frequency domain of a second channel over which the second part of system information is transmitted; a modulation and coding scheme of a second channel over which the second part of system information is transmitted; and an antenna configuration for a second channel over which the second part of system information is transmitted.

Alternatively or additionally, the first part of system information may include a first type of system information. In this case, different first parts of system information that indicate different system information of the first type may be respectively transmitted in different areas. The second part of system information may be common information transmitted jointly in the different areas in which the different first parts of system information are respectively transmitted. In this or other embodiments, the first part of system information may be transmitted more frequently than the second part of system information.

In any of the above embodiments, the second part of system information may include initial access information required for a wireless communication device to initially access the wireless communication system.

In some embodiments, the wireless communication system is a Long Term Evolution system. In this case, the first part of system information may comprise a master information block (MIB) and the second part of system information may comprise a system information block (SIB).

Embodiments herein also include corresponding methods, computer programs, and computer program products.

DETAILED DESCRIPTION

Figure 1:
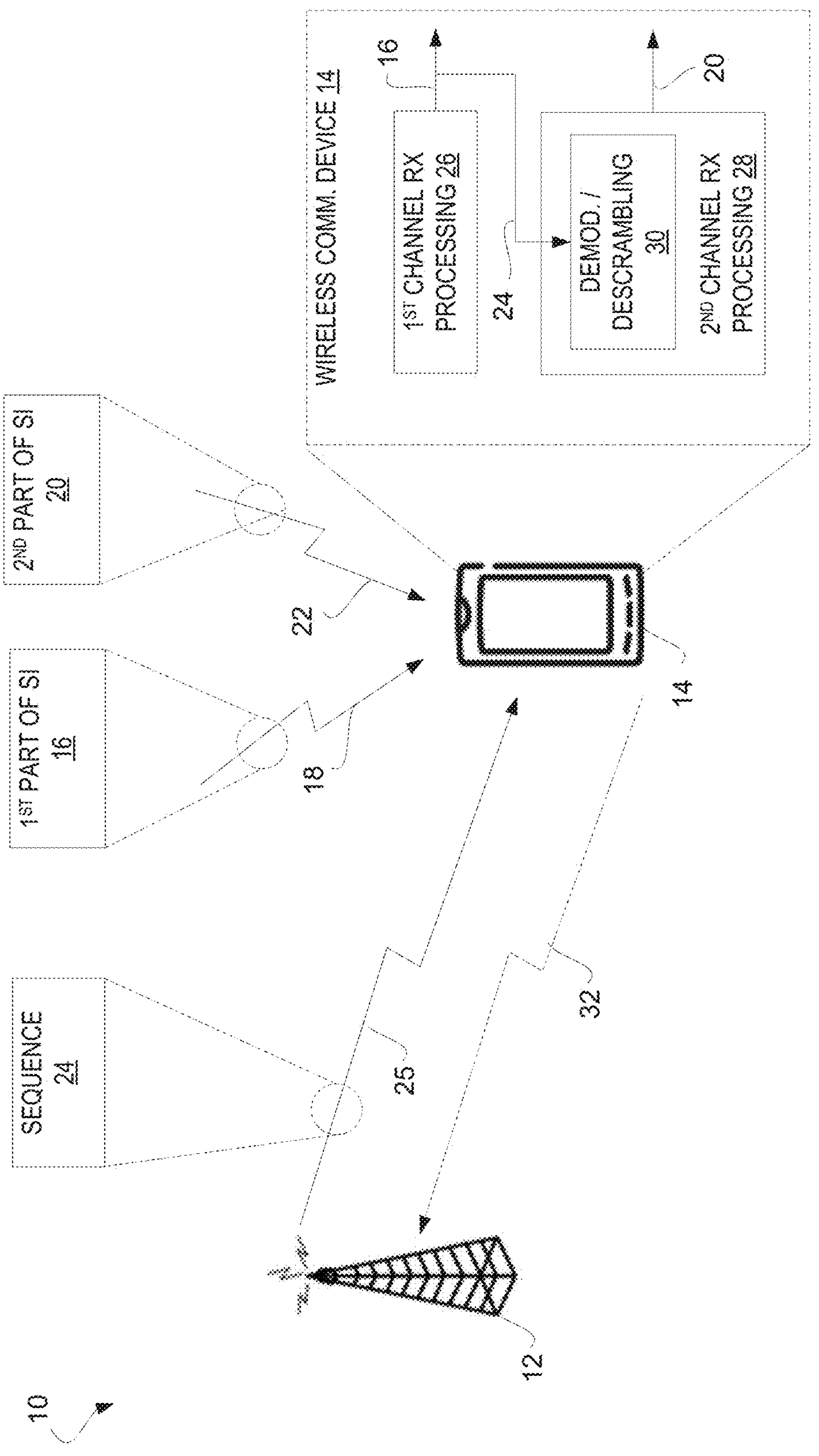
FIG. 1 is a block diagram of a wireless communication system according to one or more embodiments in which system information is transmitted in parts.

FIG. 1 illustrates a wireless communication system 10 according to some embodiments. The system 10 includes one or more radio nodes (e.g., base station(s)) such as radio node 12. The system 10 also includes one or more wireless communication devices (e.g., user equipment) such as wireless communication device 14. The system 10 is configured to transmit system information to the wireless communication device 14. System information as used herein may refer to any information transmitted to a wireless communication device to facilitate the wireless communication device operating in or accessing the system 10. System information may include for example information describing configuration(s) for random access to the system 10, tracking and paging related information, neighbor cell information, a list of public land mobile network (PLMN) identifiers, access barring information, or the like.

No matter the particular content of the system information, the system information for the system 10 is transmitted in parts. As shown in this regard, the system 10 via one or more radio nodes transmits a first part 16 of the system information over a first channel 18. The system 10 also transmits a second part 20 of the system information over a second channel 22. The first part 16 may indicate one portion of the system information, whereas the second part 18 may indicate another portion of the system information.

In this context, a radio node 12 according to embodiments herein transmits explicit signaling that is associated with the first part (16) and that indicates a sequence 24 with which the wireless communication device 14 is to demodulate or descramble the second part 20 of system information 20. In some sense, then, the explicit signaling facilitates the wireless communication device 14 receiving system information; namely, the system information in the second part 20. The signaling is explicit in the sense that it comprises one or more bits, symbols, or other information elements that encode or represent the sequence 24 (e.g., as a sequence index). The sequence 24 in some embodiments may be a demodulation reference signal (DMRS) sequence, a scrambling code sequence, or a synchronization signal sequence. Regardless, the radio node 12 transmits this explicit signaling over a signaling channel 25. Having received this explicit signaling, the wireless communication device 14 receives the second part 20 of system information over the second channel 22, by demodulating or descrambling the second part 20 uses the indicated sequence 24.

The explicit signaling may be associated with the first part 16 in any number of ways. In some embodiments, the explicit signaling is included or otherwise embedded in the first part 16 along with system information, so as to effectively accompany the system information indicated by the first part 16. In this case, therefore, the radio node 12 transmits both the first part 16 of system information and the explicit signaling included in that first part 16 over the same channel, i.e., the first channel 18 and the signaling channel 25 are one and the same.

In other embodiments, the explicit signaling is associated with the first part 16 even where the explicit signaling is not actually included in or embedded in the first part 15. For example, in one embodiment, the explicit signaling includes an identifier of the first part 16. Alternatively or additionally, the explicit signaling may be receivable using the same reference signal as that with which the first part 16 is receivable. For example, the same sequence index (e.g., system signature index, SSI, as described more fully below) may be used to derive a demodulation reference signal which is used to demodulate both the first part (16) and the explicit signaling, though received separately from one another. That is, even if the explicit signaling is excluded from the first part 16 of system information, the explicit signaling may be associated with that first part 16 in the sense that the explicit signaling is configured to be demodulated based on the same sequence with which the first part 16 of system information is configured to be demodulated.

FIG. 1 shows example device processing in these former embodiments where the explicit signaling is included in the first part 16. In this case, the wireless communication device 14 may perform receiver processing 26 on the first channel 18 in order to recover the first part 16 of system information. The wireless communication device 14 may then extract the sequence 24 embedded in the first part 16 of system information and use that sequence 24 to perform receiver processing 28 on the second channel 22. In particular, the device 14 may use the extracted sequence 24 to perform demodulation or descrambling 30 of the second part 20 of system information 20. The wireless communication device 14 in some embodiments then accesses 12 the wireless communication system 10 using both the first and second parts 16, 20 of system information.

Figure 2:
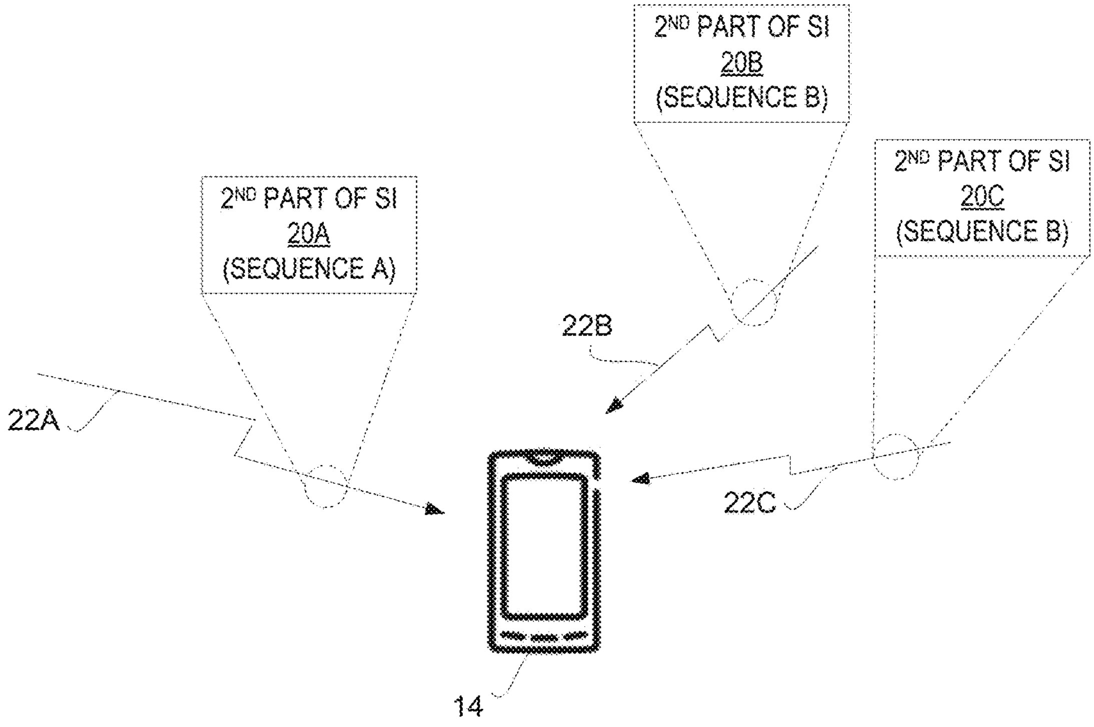
FIG. 2 is a block diagram of a system in which multiple second parts of system information are receivable according to one or more embodiments.

The sequence 24 in some embodiments distinguishes the second part 20 of system information from one or more other second parts of system information that are receivable using one or more other respective sequences for demodulating or descrambling. In one or more embodiments, these different sequences are orthogonal such that demodulating or descrambling a second part of system information using a sequence other than that with which the second part was configured prevents recovery of that second part, e.g., the second part just appears as noise. FIG. 2 shows one example.

As shown, different second parts 20A-C of system information are transmitted in the system 10. These second parts 20A-20C may comprise system information of the same type, may be received over channels 22A-22C of the same type, and may complement respective first parts of system information. But the second parts 20A-20C may indicate different values for the system information of that type. For example, each second part 20A-20C may indicate that the wireless communication device 14 is to access the system 10 using different random access preambles or different random access powers. In view of this, the second parts 20A-20C are configured to be receivable by the wireless communication device 14 using different sequences for demodulating or descrambling. As shown, for instance, second part 20A is receivable using sequence A, whereas second parts 20B and 20C are receivable using sequences B and C, respectively.

In this way, the second parts 20A-20C in some embodiments are effectively paired with and only recoverable in conjunction with the respective first parts that are associated with explicit signaling that indicates the corresponding sequences A-C. This means that, upon receipt of a given first part of system information, a single targeted one of multiple different possible second parts 20A-20C is unambiguously receivable using the sequence signaled in association with that first part. This advantageously prevents or minimizes ambiguity regarding which second part 20A-20C complements a received first part of system information.

Figure 3:
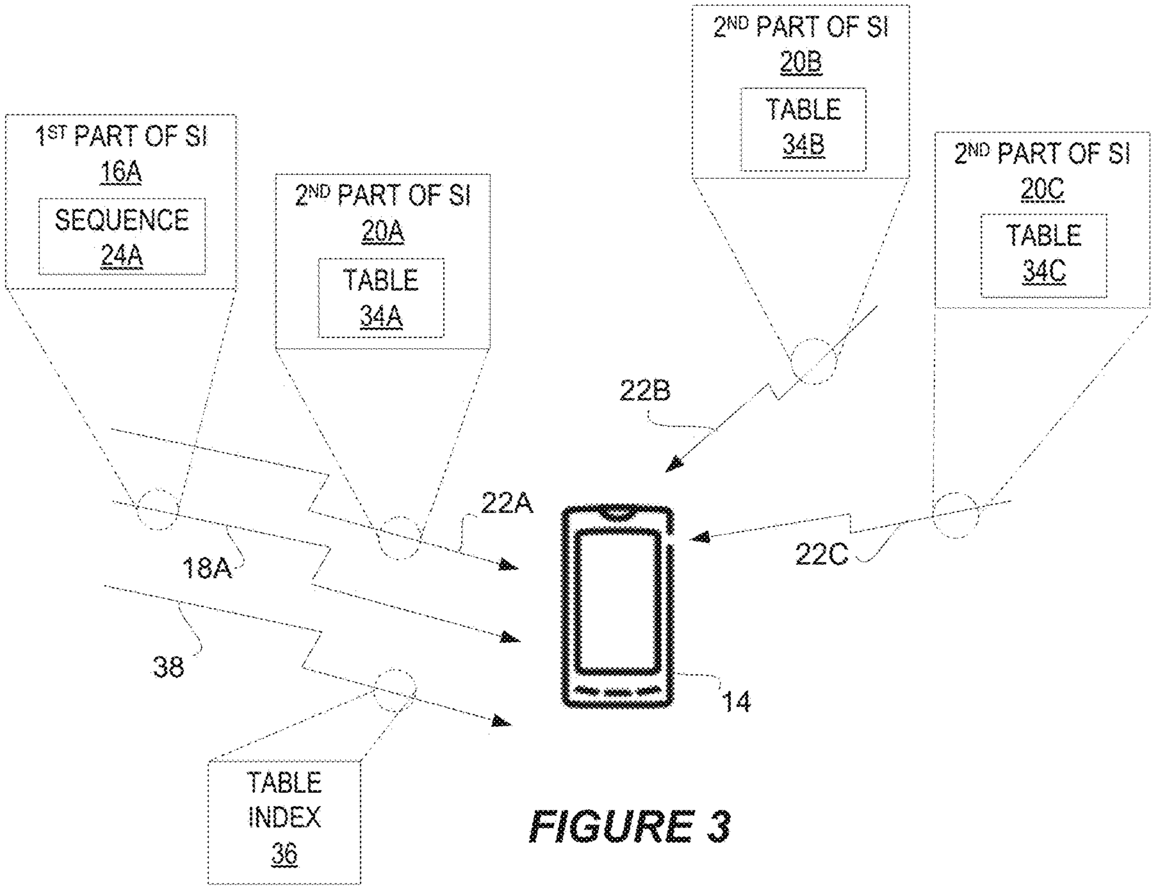
FIG. 3 is a block diagram of a system in which a second part of system information comprises a table according to one or more embodiments.

Similarly, consider embodiments where multiple different possible second parts 20A-20C of system information include respective tables 34A-34C of the same type, as shown in FIG. 3. The tables 34A-34C are each accessible using an index 36 obtained by the device 14, e.g., based on reception of a signal 38 such as a synchronization signal. The index 36 in this regard may be a valid index into each of the tables 34A-34C, but may map to entries in the different tables 34A-34C that contain different system information (e.g., different random access preambles). Because of this, ambiguity would otherwise exist regarding which of the tables 34A-34C is targeted by the index 36, i.e., which of the tables 34A-34C the index 36 was actually intended to index into. This ambiguity is resolved by a sequence 24A indicated by explicit signaling that as shown here is included in a first part 16A of system information associated with the obtained index 36. In this example, the associated sequence 24A distinguishes the second part 20A of system information as including the table 34A targeted by the index 36, e.g., as opposed to other second parts 20B and 20C that are candidates for being targeted by the index 36.

Figure 4:
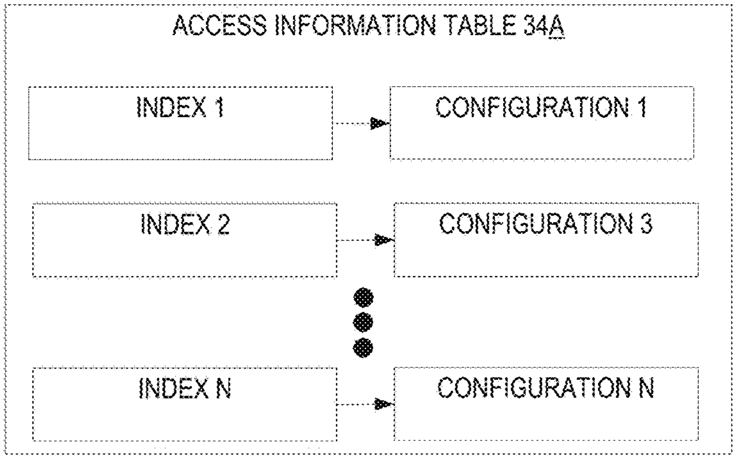
FIG. 4 is a block diagram of an access information table according to some embodiments.

In some embodiments, the tables 34A-34C are each of the same type in the sense that they are each an access information table. FIG. 4 shows an example of table 34A in such embodiments. As shown, the table 34A contains multiple configurations 1, 2, . . . N for accessing the wireless communication system 10. Different configurations may configure a wireless communication device 14 to access the system 10 in different ways, e.g., using different values for a certain access parameter. The multiple configurations 1, 2, . . . N in the table 34A are respectively indexed by different indices 1, 2, . . . N.

Tables 34B and 34C may be formed in a similar way, but with different configurations for accessing the system 10, or at least different mappings between indices and configurations. Thus, particularly when the table 34A has at least as many configuration entries as that of the other tables 34B-34C transmitted in the system 10, any given index 1, 2, . . . N validly maps to a configuration in each of the tables 34A-34C, but the configuration mapped to may vary depending on which of the tables 34A-34C is index into. Again, this ambiguity is resolved by a sequence 24 indicated by explicit signaling that is included in or otherwise associated with the first part 16 of system information.

Figure 5:
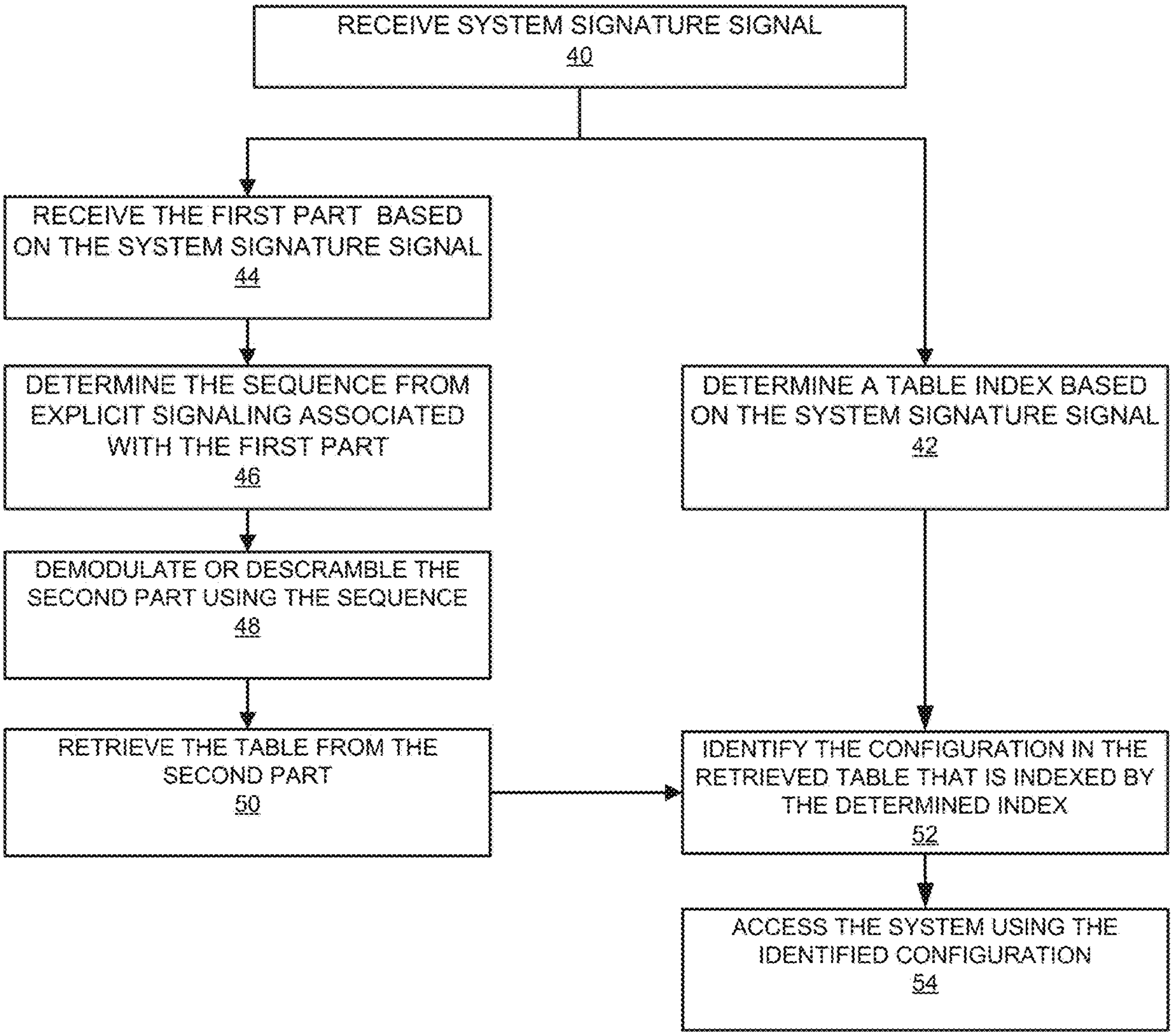
FIG. 5 is a logic flow diagram of processing performed by a wireless communication device for receiving system information in parts according to some embodiments.

FIG. 5 illustrates processing performed by a wireless communication device 14 in this regard, in embodiments where the device 14 obtains the index based on a so-called system signature (SS) signal. Indeed, as shown, the device 14 receives a SS signal (Block 40). The SS signal may be a synchronization signal in some embodiments. Regardless, the SS signal indicates one of multiple different possible system signatures for the system 10. When the device 14 needs to access the system 10, it may search for an SS signal. In case the device 14 detects multiple SS signals, the device 14 may perform this processing on individual ones of the detected SS signals, as needed, in order of signal strength, quality, or other signal characteristic (e.g., the device 14 may initially select the strongest one).

Based on a received SS signal, the device 14 determines a table index (Block 42). The SS signal may for example encode or map to the table index. In this example, the table index is an index into an access information table. But multiple access information tables are transmitted in the system 10. To identify which of the access information tables the table index is intended to index into, the device 14 receives a first part 16 of system information also based on the SS signal (Block 44). The device 14 may for example derive or otherwise determine a sequence (e.g., a DMRS sequence, descrambling sequence, or synchronization signal sequence) from the SS signal, e.g., using a one-to-one mapping between SS signals and sequences, as for example preconfigured through standardization, the device's universal subscriber identity module (USIM), etc. The device 14 may then receive the first part 16 using that sequence. In some embodiments, this sequence used for receiving the first part 16 is different than the sequence used for receiving the second part 20 of system information. In any event, the table index and the first part 16 are (uniquely) associated with one another through having been determined based on the same signal, i.e., the same SS signal.

Next, similar to that described above, the device 14 determines a sequence 24 from explicit signaling included in or otherwise associated with the first part 16 of system information (Block 46). The device 14 demodulates or descrambles the second part 20 of system information using this determined sequence 24 (block 48), and retrieves or recovers an access information table from the second part 20 (Block 50). With the sequence 24 having distinguished this second part 20 from other possible second parts in the system, the sequence 24 effectively identifies the access information table included in this second part 20 as being the table into which the table index is intended to index into. That is, the sequence 24 distinguishes the particular access information table included in the second part 20 as being the target of the index associated with the SS signal (and thereby the first part 16 of system information, given the association between the first part 16 and the system signature signal).

Accordingly, the device 14 identifies the configuration in the retrieved access information table that is indexed by the table index (Block 52). The device 14 may do so by selecting from the different configurations in the table the configuration to which the table index maps. The device 14 then accesses the system 10 using the identified configuration (Block 54).

In some embodiments, the configurations 1, 2, . . . N in each table 34A-34C (exclusively) concern initial access to the system 10, e.g., via random access. In this and other embodiments, different configurations 1, 2, . . . N may configure the device 14 to initially access the system 10 by performing random access with different random access configurations (e.g., with different random access preambles, timing, transmit power, and/or other random access parameters). Alternatively or additionally, different configurations 1, 2, . . . N may configure the device 14 to initially access the system 10 by using different public land mobile network (PLMN) identifiers.

Figure 6A:
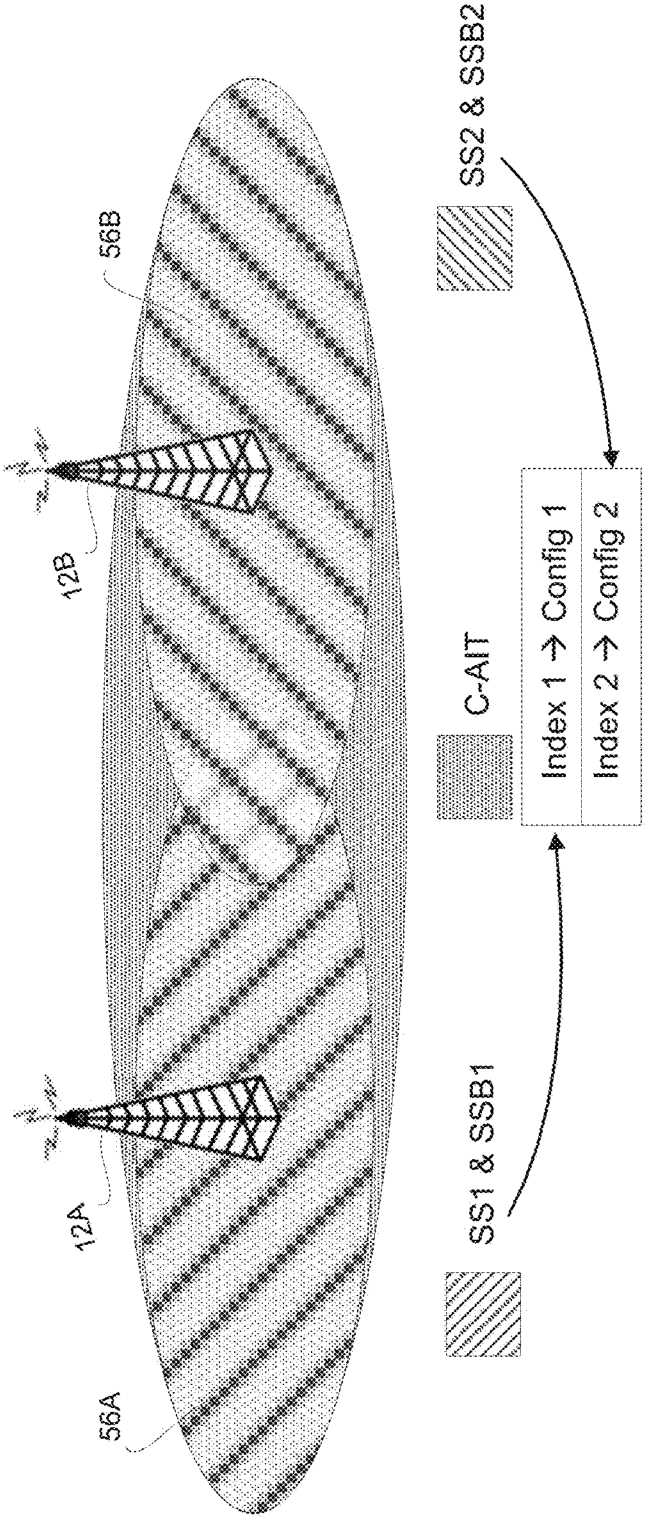
FIG. 6A is a block diagram of system information transmission according to one exemplary deployment scenario.

FIG. 6A illustrates one example of these embodiments in a context where a second part of system information constitutes common access information that is commonly transmitted in multiple areas 56A-B, whereas different first parts of system information are respectively transmitted in those multiple areas 56A-B. Radio nodes 12A and 12B may for example jointly broadcast the second part of system information, e.g., simultaneously using a single frequency network (SFN) transmission, but the radio nodes 12A, 12B each individually broadcast different first parts of system information. As another example, radio nodes 12A-12B may be lower power radio nodes that broadcasts different first parts of system information over a relatively smaller coverage area, whereas a higher power radio node (not shown) broadcasts the second part of system information over a relatively larger, overlapping coverage area. The different first parts of system information in this regard may indicate different system information of the same type, such that this different system information is respectively transmitted in different areas 56A-B.

With the second part of system information transmitted in this way, the access information table included in that second part is appropriately referred to as a common access information table (C-AIT). The C-AIT and any other common access information included in the second part may be transmitted (e.g., broadcasted) over a common access information channel (here referred to as a physical anchor channel, PACH). The second part may therefore be referred to for convenience as the PACH system information.

By contrast, a first part of system information transmitted in an individual area 56A or 56B is referred to here as a system signature block (SSB), with SSB1 transmitted in area 56A and SSB2 transmitted in area 56B. As shown, therefore, a first SS signal (SS1) and a first SSB (SSB1) is transmitted in area 56A, whereas a second SS signal (SS2) and a second SSB (SSB2) is transmitted in area 56B. The first SS signal (SS1) is associated with a first C-AIT index (Index 1) which is mapped to a first access information configuration (Config 1) in the C-AIT. The second SS signal (SS2) is associated with a second C-AIT index (Index 2) which is mapped to a second access information configuration (Config 2) in the same C-AIT. Both the first SS block (SSB1) and the second SS block (SSB2) therefore contain or are otherwise associated with explicit signaling that indicates the same sequence for demodulating or descrambling the PACH system information. The sequence indicated by this explicit signaling may distinguish the PACH as conveying the C-AIT targeted by the first and second C-AIT indices, as opposed to any other C-AIT conveyed by another PACH whose transmission may leak into areas 56A and/or 56B.

Figure 6B:
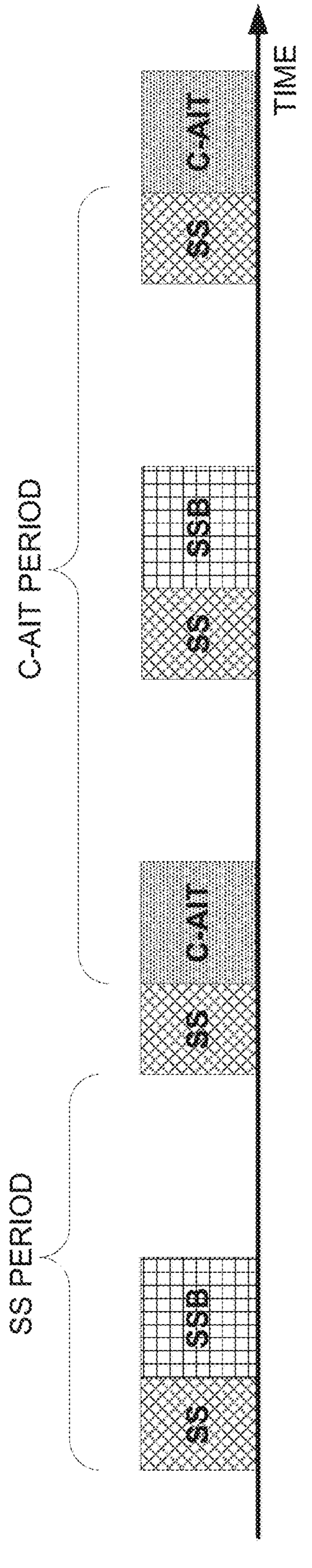
FIG. 6B is a timing diagram of system information transmission according to one exemplary deployment scenario.

FIG. 6B indicates the transmission timing of the SS, SSB, and C-AIT according to some embodiments where the first part of system information (in the form of an SS signal) is transmitted more frequently than the second part of system information (in the form of the C-AIT). As shown, for example, an SS signal has a transmission period that is shorter than the transmission period of the C-AIT.

In general, though, the SS transmission period and the C-AIT transmission period may be a tradeoff between system energy performance, device energy performance, and access latency in cases where the SS needs to be read before access. In some deployments, therefore, the C-AIT period may be the same as the SS period (e.g., in small indoor networks). In other embodiments, the C-AIT period may be very large (e.g., 10 seconds), in order to support extremely power limited scenarios (e.g., off-grid solar powered base stations). For typical deployment scenarios, however, the SS transmission period may be between 5-100 ms and the C-AIT transmission period may be between 5-2000 ms. The SS period may depend on a detected level of communication activity to or from the radio node transmitting that SS. With the SS being smaller in size than the C-AIT (e.g., since the SS conveys an index into the C-AIT rather than the C-AIT itself), a shorter SS period than the C-AIT period facilitates system information changes with reduced signaling load. Indeed, system information changes may be accomplished by sending a smaller-sized SS without an accompanying larger-sized C-AIT.

An SSB may be transmitted in order to convey system information that cannot be conveyed via an SS signal (e.g., via a synchronization signal sequence), or need not be conveyed with the same transmit period as an SS signal or C-AIT. An SSB may be transmitted for instance after every Nth SS transmission, where for instance N=1, 2, . . . , 20. FIG. 6B for instance shows an example where N=2. The transmission period of the SSB, though, depends on the timing needs for the system information that it conveys.

An SSB in this regard conveys system information and includes or is otherwise associated with explicit signaling that indicates a sequence for demodulating or descrambling the PACH system information. The explicit signaling (e.g., including in the SSB) may indicate one or more sequences towards this end. The signaling for example indicate one or both of a DMRS sequence and a scrambling code sequence. A device 14 may therefore demodulate the PACH using the indicated DMRS sequence and/or descramble the PACH using the indicated scrambling code sequence.

The explicit signaling associated with an SSB in some embodiments alternatively or additionally indicates a synchronization signal sequence that may be used as a timing reference for demodulating the PACH, i.e., a PACH-SS where SS as used in this way is defined to denote a synchronization signal. The PACH-SS may be indicated or actually used by a device 14 for fine-tuned time synchronization if for example the PACH is transmitted by a radio node different than the radio node(s) transmitting the corresponding SS signal and the SSB, without tight time synchronization between those nodes (e.g., within a cyclic prefix). The PACH-SS may be indicated or used by a device 14 also if the PACH is transmitted on a different frequency band than the band on which the corresponding SS signal and SSB are transmitted. Otherwise, if the PACH is transmitted on the same frequency band as the SS signal and the SSB, if the PACH is transmitted the same radio node as the SS signal and SSB, or if the PACH is transmitted by a different radio node that is tightly time synchronized with the radio node transmitting the SS signal and SSB, the PACH-SS may not be indicated by the SSB or even if it is not used by the device 14. In general, therefore, a device 14 may at least partly derive the timing of the SSB and the PACH from the same or different synchronization signals. The transmit format of the SSB may be at least partly derived from an index associated with its corresponding synchronization signal, whereas the transmit format of the PACH may be at least partly derived from system information embedded or otherwise included in the SSB.

Accordingly, in some embodiments, the explicit signaling associated with the SSB generally indicates a transmission format describing how the C-AIT is transmitted (e.g., via a "PACH format information" field). The explicit signaling in this regard may include information describing radio resources on which the C-AIT transmission occurs (e.g., in the form of a "C-AIT pointer"). The information may for example indicate the time and/or frequency resources on which the C-AIT transmission occurs, e.g., by indicating a resource location and/or size of the channel over which the C-AIT is transmitted (i.e., the PACH). The information may indicate the PACH time and/or frequency resources in terms of a number of sub-subcarriers, a number of OFDM symbols for the PACH, a frequency band for the PACH, a radio access technology (RAT) used for the PACH, or the like.

Alternatively or additionally, the explicit signaling associated with an SSB may include information indicating a modulation and coding scheme (MCS) used on the PACH. The information may indicate this in terms of a number of information bits, a number of channel bits, a modulation index, channeling coding information (e.g., redundancy version), or the like. In still other embodiments, the explicit signaling associated with an SSB may indicate an antenna configuration of the PACH. The signaling may indicate this in terms of a precoder used for the PACH, a number of antennas used to transmit on the PACH, a diversity encoding scheme, or the like. In yet other embodiments, the explicit signaling associated with an SSB may indicate an identifier for the PACH. Alternatively or additionally, the explicit signaling associated with an SSB may indicate a system frame number (SFN), a system information value tag or hash code, one or more PLMN IDs (e.g., as a compressed list), tracking area information, timing information for device waking up after long sleep periods, etc.

The PACH in some embodiments conveys other common access information in addition to the C-AIT. Other common access information in this regard may include a global time, a PLMN ID list, common access barring information, tracking area information, or the like. In one or more embodiments, the PACH also conveys earthquake and tsunami warning system (ETWS) information and/or commercial mobile alert system (CMAS) information indicating how to access the ETWS and/or CMAS. The PACH may have a dynamic size in order to flexibly include all or some of this information on a dynamic basis.

Figure 7:
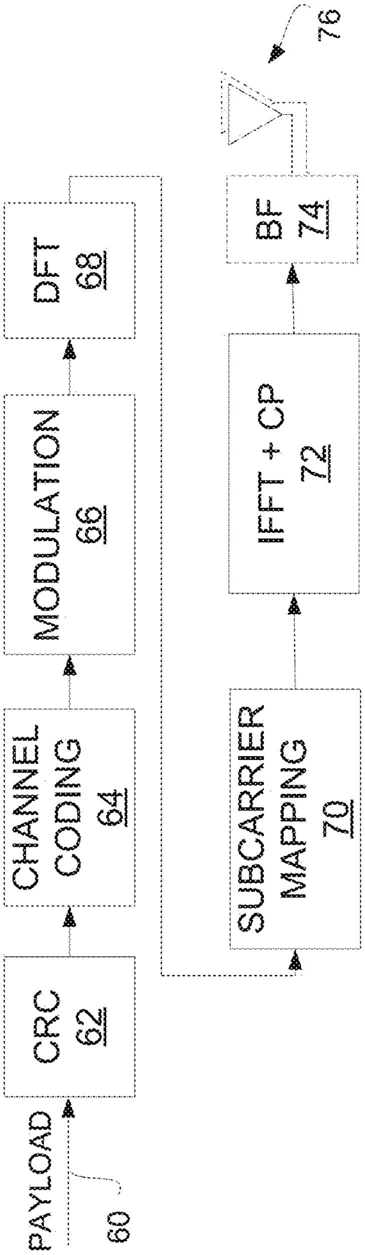
FIG. 7 is a block diagram of a transmit chain for system information transmission according to some embodiments.

FIG. 7 illustrates additional details concerning transmit processing for the PACH according to some embodiments. As shown, a cyclic redundancy check (CRC) is added to the payload 60 of the PACH (Block 62). In one or more embodiments that support flexible payload size, padding may be used to match the payload size including the CRC to one of multiple different payload sizes predefined as possible for the PACH (e.g., 200, 300, or 400 bits). The payload, CRC, and any possible padding is then channel coded (Block 64). The encoded data is then modulated (Block 66) so as to map the encoded data to modulation symbols (e.g., Quadrature Phase Shift Keying (QPSK) symbols). The resulting modulation symbols are Discrete Fourier Transform (DFT) precoded (Block 68), e.g., to achieve a low peak to average power ratio (PAPR) waveform. The precoded signal is next mapped to a predefined group of subcarriers (Block 70), and then passed through Block 72, which performs inverse fast fourier transform (IFFT) processing and adds a cyclic prefix (CP). In some embodiments, the resulting signal is beamformed (BF) at Block 74 before being transmitted (e.g., broadcasted) via one or more antennas 76.

Figure 8A:
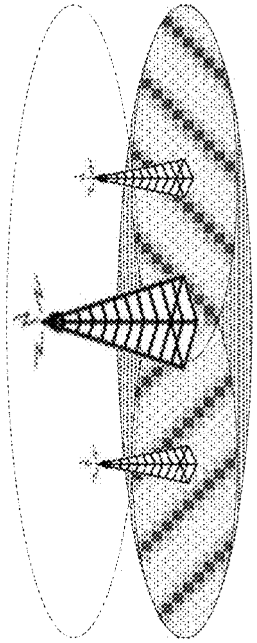
FIGS. 8A-8B are block diagrams of system information transmission according to other exemplary deployment scenarios.
Figure 8B:
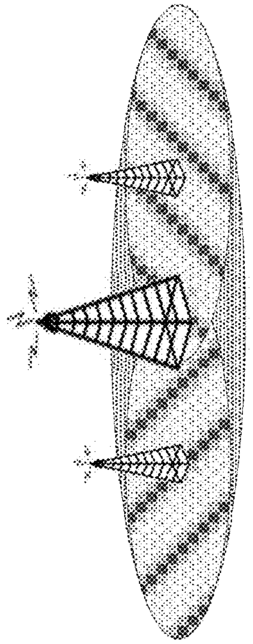

Although FIGS. 6A-6B illustrated the embodiments using one example deployment scenario, other deployment scenarios for system information are also possible. FIGS. 8A-8B illustrates a couple of other examples. In FIG. 8A, for instance, common access information, e.g., in the form of the C-AIT, is delivered by an overlaid node (e.g., via LTE), rather than jointly via multiple nodes that serve different parts of the overlaid node's coverage area. In FIG. 8B, by contrast, the common access information is delivered by each node, including an overlaid node as well as multiple nodes that serve different parts of the overlaid node's coverage area. That is, all nodes may individually transmit an SS signal, SSB, and C-AIT, whereby each C-AIT may contain only a single entry related to the SS signal transmitted by the same node or each C-CAIT may contain multiple entries related to the SS signals transmitted by multiple nodes. However, there could be heavy interference for C-AIT reception within a synchronized network on the same frequency. To avoid C-AIT interference, C-AITs transmitted by different nodes could be time-shifted relative to one another.

In some embodiments, different types of radio nodes with significantly different transmission power may need to have different system information. These different types of radio nodes in some embodiments have different system signatures. For instance, radio nodes may be partitioned into different power classes, each power class having its own system signature. Radio nodes having the same power class may have the same signature, unless different system signatures are needed for other reasons, e.g., backhaul capabilities, processing capabilities, or the like. The different types may also be classified based on activity level, e.g., radio nodes being in an active mode or sleep mode. Regardless, system information associated with multiple system signatures may be broadcast by one or more of the radio nodes, e.g., in the form of a C-AIT, according to any of the deployment options herein. The system information may for instance be broadcast by only a few high-power radio nodes.

In these and other embodiments, a system signature may be compared to a traditional cell-specific reference signal (CRS) but with notable differences. Similar to a CRS, a system signature may be associated with system information, and controls the initial device transmissions. However, some radio nodes, even adjacent, may have the same system signature, e.g., as long as they have similar transmission power or activity. In fact, all radio nodes of the same type may have the same system signature. This contrasts with traditional systems in which a physical cell identity (PCI) conflict would occur in case two neighboring radio nodes would have the same PCI and hence transmit the same CRS. Indeed, transmission of the same system signature by adjacent radio nodes may add in a constructive manner rather than in an interfering manner. Another difference is that the actual system information may not be transmitted from the same radio node that transmits the system signature.

Further in this regard, comparing with CRS, it is enabled to either transmit the system signature with less power, which reduces network energy consumption, or larger cells in the macro layer deployment may be used. Larger cells in the macro layer also increase the support for radio network node sleep mode in the underlying network layers. For each active node there may be a larger number of in-active nodes if the macro layer is sparse. If two adjacent nodes are transmitting the same CRS in current systems then per definition they will form a joint cell. Since for a joint cell they must also transmit exactly the same synchronization signals and system broadcast signals. Also all CRS-based control and data channels must be transmitted in identical manner from both nodes. If they fail to do any of this then a PCI-conflict appears and that is something that is not allowed to happen during normal operation. This is an error event that will cause dropped calls and handover failures and it must be resolved. With system signatures, this is allowed since the device does not assume that any single node transmits the system signature. The device may be assigned a serving node/cell after the initial access has been performed. In the access procedure the device will receive information that enable it to access a node/cell (e.g., random access may not be node or cell specific). In fact, the node/cell might not have been there prior to the initial access of the device, e.g., it was in a non-active or dormant state.

Accordingly, in some embodiments, a device uses the initial access information in the C-AIT corresponding to a certain SS signal to request initial access to the system, and then thereafter uses other system information received after that initial access. The device may for instance receive some system information (e.g., multi-RAT lists) referred to as common system information after initial system access, and then receive other system information (e.g., transmission mode support or CRS configuration) referred to as non-specific system information after initial node access. In still other embodiments, though, all or some of this other system information may already be known (e.g., preconfigured) at the device.

In some embodiments, for example, a device stores an access information table (AIT) in its memory. The AIT may be updated based on a C-AIT received over common control plane signaling before initial system access and/or a dedicated AIT received over dedicated control plane signaling after initial system access. The AIT may therefore contain the same information as the C-AIT, the same information as the D-AIT, or some combination of the C-AIT and D-AIT.

Note that the D-AIT may contain some parameters (i.e., not entries) that are not included in the C-AIT, e.g., because they are not essential for initial system access. Such parameters may complement each entry in the table or be added to a common part separate from the entries. These parameters would thus also be included in the AIT, provided that the system 10 has transmitted the D-AIT to the device. The D-AIT may use the same SS signal to point to different configurations for different devices. For example, in the case of system congestion, this would allow the system 10 to have different access persistency values for different devices.

In view of the above, system information in some embodiments is effectively decoupled from the traditional cell. This decoupling may be done in order to efficiently support increasingly important use cases and deployments such as higher order sectorization, Cloud radio access network (RAN), coordinated multipoint (CoMP), high frequency band operation, extreme area coverage, etc.

Figure 9:
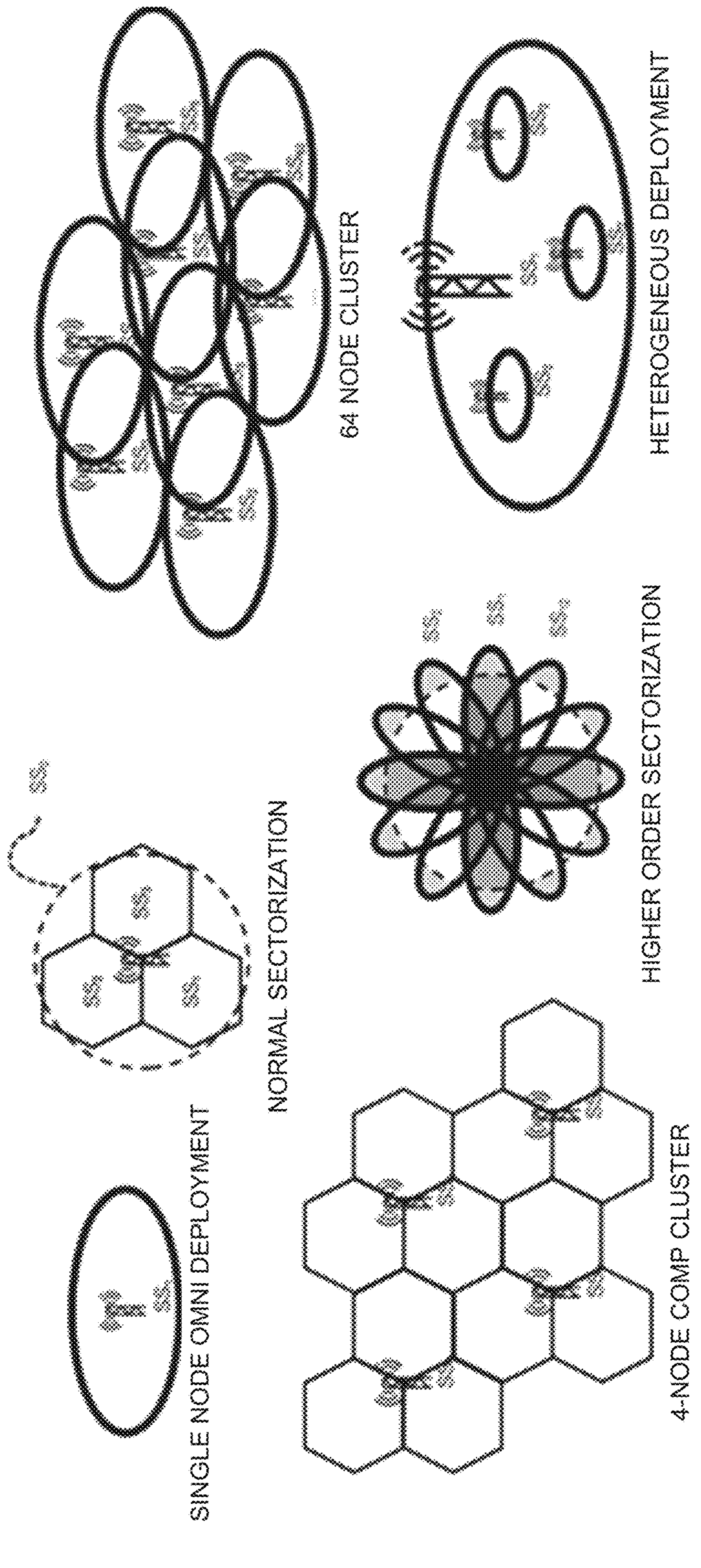
FIG. 9 is a block diagram of different deployment options for a logical anchor cell according to some embodiments.

As a consequence, a new logical network entity may be effectively defined above the traditional cell or node. This new logical network entity may be referred to as a logical "anchor cell", "anchor area", or "anchor node" (although other names may be a "super-cell", "hyper-cell", etc.). The term anchor cell will be used hereinafter, with embodiments extending equally to anchor area, anchor node, etc. An anchor cell contains one or more cells, sectors, access node coverage areas, and/or beams. Some examples are shown in FIG. 9. In the examples in FIG. 9, one part of system information (e.g. SSB) may be sent from the different sectors (beams, etc.) and another part of the system information (e.g. C-AIT) may be jointly transmitted over several sectors (beams, etc.). In the context of a system 10 that has both regular cells and anchor cells, therefore, system information is transmitted from both individual cells (or sectors, beams, node coverage areas, etc.) as well as from logical anchor cells. For example, some system information may be transmitted using a single node transmission format (e.g., cell broadcast) whereas other system information may be transmitted using a multi-node transmission format (e.g., OFDM SFN).

In this context, the "SS+SSB" signals may be transmitted from a different set of nodes than the PACH. The number of combinations is likely to be large. Attempting to blindly decode the SS, SSB, and PACH in the face of all these combinations would cause additional access delay and consume device battery. Worse, even if the device were to succeed in blindly decoding the PACH, the device may have decoded a PACH that was not the correct one, but which is intended for another area, e.g. a neighboring anchor cell. Indeed, in some embodiments, the SS signals are only locally unique and different PACH transmissions may contain different information relating to different SSs. Note that this also means that SSs may be reused and be associated with different access information in different areas (e.g. in different anchor cells). Hence, the PACH transmission (i.e. the C-AIT) may contain information that is associated with SSs that are used in the device's current anchor cell (including the (strongest) SS the device can currently receive), but which information is not valid in the device's current anchor cell (but e.g. in a neighboring anchor cell). In case the device can receive more than one PACH, then it may not know which one that is the intended one.

In case the PACH is transmitted on a different frequency band (e.g. a lower frequency) with different distance dependent path loss it may be (in practice) impossible to exactly match the coverage area of the PACH with the union of the coverage areas of the constituent SS and SSB transmissions. The device will often receive more than one PACH in such a scenario.

As mentioned above, a C-AIT communicated inside a PACH transmission may contain information about (reused or different) SS signals that are not part of the same anchor cell. If the device cannot know from which PACH it has received the access information, then it would be unpredictable how the device would behave when it performs a system access. Depending on if the device has received the access information from another anchor cell or from this anchor cell, the access procedure could differ.

One or more embodiments address these scenarios by introducing a field in or otherwise associated with the first system information part that is used to demodulate or descramble the second system information part. In the context of the above example, this would for example mean that the SSB may contain e.g. "PACH-DMRS-information" and/or "PACH-scrambling-code-information" and possibly a separate synchronization signal associated with the PACH (e.g. PACH-SS). The PACH in some embodiments may include the C-AIT. The PACH may also include an anchor cell global identity (ACGI) and/or a tracking RAN access code or tracking area code at the anchor cell level.

Generally, various embodiments herein transmit explicit signaling that is associated with a first part 16 of system information and that identifies a second part 20 of system information as complementing that first part 16. In this way, the explicit signaling distinguishes the second part 20 from any other second part of system information in the system 10, e.g., so as to reduce ambiguity regarding which second part corresponds to the first part 16. This identification of the second part 20 may be accomplished through explicit signaling of a sequence used for demodulating or descrambling the second part 20. Alternatively or additionally, the identification may be accomplished through explicit signaling of a second part identifier or a second channel identifier (e.g., a PACH identifier).

Note that the borders between concepts like cells, sectors, access node coverage areas and beams may be somewhat blurred in forthcoming wireless communication system (e.g., 5G systems). This is because its relevance can be questioned, as beamforming becomes prevalent and functions and mechanisms that traditionally have been tied to a cell get distributed across multiple access nodes. Accordingly, although the term cell has been used to describe some embodiments (e.g. when describing the new logical network entity as consisting of a logical entity containing a set of cells), those embodiments extend equally no matter the particular nomenclature used to supersede the traditional "cell" term.

Moreover, although some embodiments are described in the context of an envisioned future 5G access system with SS Block and C-AIT transmitted by the system, the embodiments equally apply in a generic system with multiple system information parts. In this regard, any embodiments described in terms of SSB and C-AIT/PACH may be generalized or extended to apply to any first part of system information and second part of system information. This may be further generalized to an arbitrary number (N) of system information parts. That is, the above described embodiments may be generalized to more than two system information parts, such that each system information part includes or is associated with information of the above described type(s) (e.g., format and demodulation-assisting information such as DMRS, scrambling sequence, associated synchronization signal sequence/index) related to the next system information part (i.e. a "sequential chain" of system information parts). Alternatively, the first system information part includes or is associated with format/demodulation-assisting information related to each of the other system information parts. In a generalization of these two principles, hybrids between the two principles are possible, wherein any of the system information parts in a sequential chain of system information parts could include or be associated with format and demodulation-assisting information related to more than one other system information part (i.e. essentially turning the sequential chain into a "tree" of system information parts). Accordingly, while first and second system information parts have been used herein, the terms first and second do not necessarily imply an ordering of the system information parts, e.g., whether in time, frequency, or otherwise.

Furthermore, although some embodiments have been described in the context of future 5G systems, the embodiments are equally extendable to other types of systems. For example, the wireless communication system 10 in some embodiments is an LTE system. In this case, the first part of system information may comprise a master information block (MIB) and the second part of system information may comprise a system information block (SIB).

A radio node 12 herein is any type of node (e.g., a base station) capable of communicating with another node over radio signals. A wireless communication device 14 is any type device capable of communicating with a radio node 12 over radio signals. A wireless communication device 14 may therefore refer to a user equipment (UE), a mobile station, a laptop, a smartphone, a machine-to-machine (M2M) device, a machine-type communications (MTC) device, a narrowband Internet of Things (IoT) device, etc. That said, although the wireless communication device 14 may be referred to as a UE, it should be noted that the wireless communication device 14 does not necessarily have a "user" in the sense of an individual person owning and/or operating the device. A wireless communication device 14 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Figure 10:
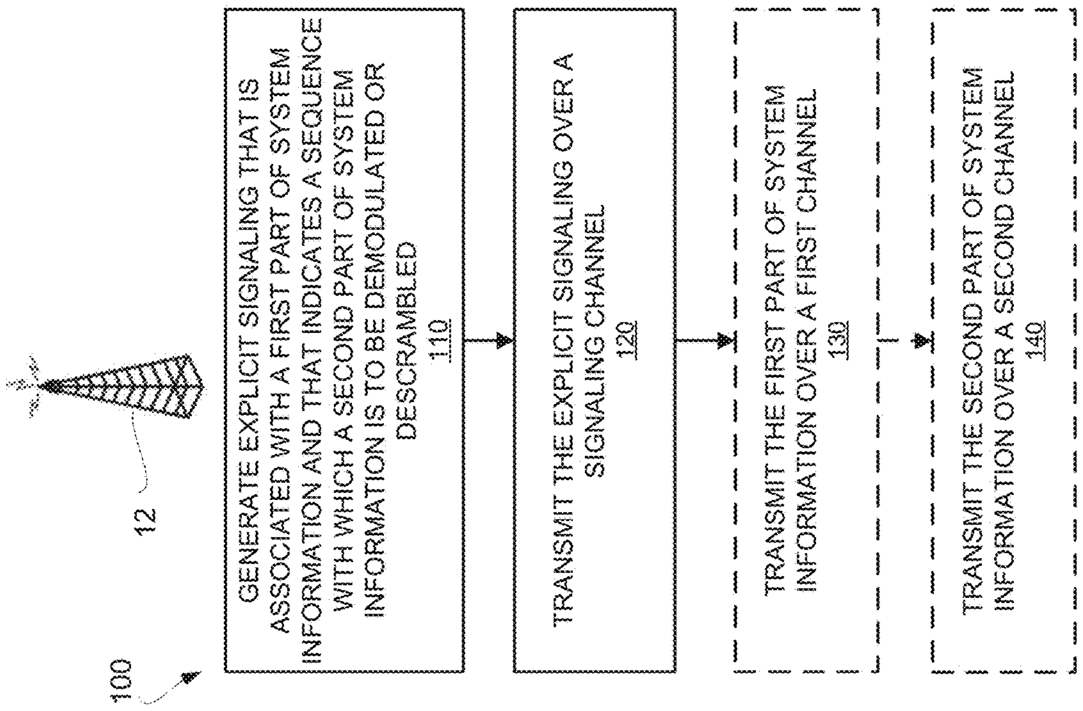
FIG. 10 is a logic flow diagram of a method performed by a radio node configured for use in a wireless communication system in which system information is transmitted in parts.

In view of the above modifications and variations, those skilled in the art will appreciate that a radio node 12 herein generally performs the method 100 shown in FIG. 10. The method 100 comprises generating explicit signaling that is associated with a first part 16 of system information and that indicates a sequence 24 with which a second part 20 of system information is to be demodulated or descrambled (Block 110). The method 100 also comprises transmitting the explicit signaling over a signaling channel 25 (Block 120). Alternatively or additionally, the method 100 in some embodiments comprises transmitting the first part 16 of system information over the first channel 18 (Block 130), whereas in other embodiments a different radio node transmits this first part 16. Alternatively or additionally, the method 100 in some embodiments comprises transmitting the second part 20 of system information over the second channel 22 (Block 140), whereas in other embodiments a different radio node transmits this second part 20.

Figure 11:
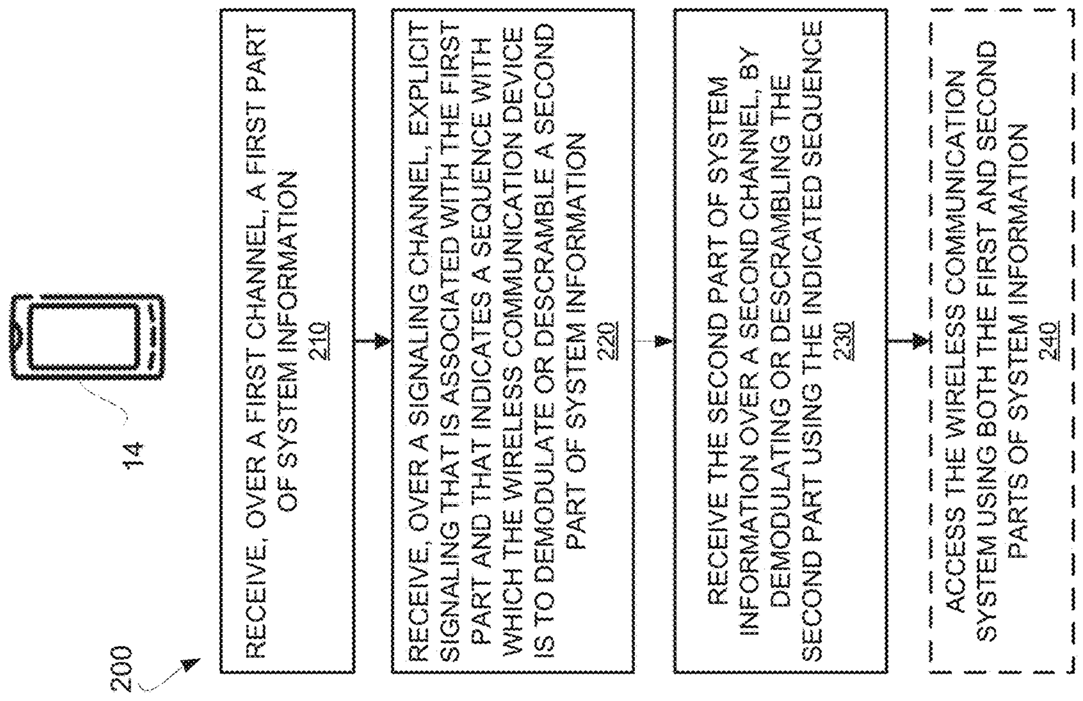
FIG. 11 is a logic flow diagram of a method performed by a wireless communication device for receiving system information in parts according to some embodiments.

Those skilled in the art will appreciate that a wireless communication device 14 herein correspondingly performs the method 200 shown in FIG. 11 for receiving system information for a wireless communication system in parts. The method 200 comprises receiving, over a first channel 18, a first part 16 of system information (Block 210). The method 200 also comprises receiving, over a signaling channel, explicit signaling that is associated with the first part 15 and that indicates a sequence 24 with which the wireless communication device 14 is to demodulate or descramble a second part 20 of system information (Block 220). The method 200 also comprises receiving the second part 20 of system information over a second channel 22, by demodulating or descrambling the second part 20 using the indicated sequence 24 (Block 230). In some embodiments, the method 200 also comprises accessing the wireless communication system 10 using both the first and second parts 16, 20 of system information (Block 240).

Note that the radio node 12 as described above may perform any of the processing herein by implementing any functional means or units. In one embodiment, for example, the radio node 12 comprises respective circuits or circuitry configured to perform the steps shown in FIG. 10. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 12:
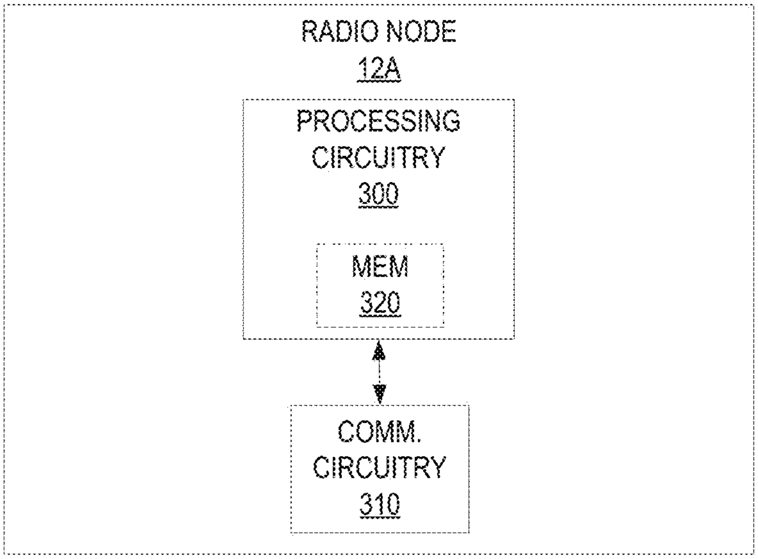
FIG. 12 is a block diagram of a radio node according to some embodiments.

FIG. 12 illustrates a radio node 12 implemented in the form of a radio node 12A in accordance with one or more embodiments. As shown, the radio node 12A includes processing circuitry 300 and communication circuitry 310. The communication circuitry 310 is configured to transmit and/or receive information to and/or from one or more other nodes, e.g., via any communication technology. The processing circuitry 300 is configured to perform processing described above, e.g., in FIG. 10, such as by executing instructions stored in memory 320. The processing circuitry 300 in this regard may implement certain functional means, units, or modules.

Figure 13:
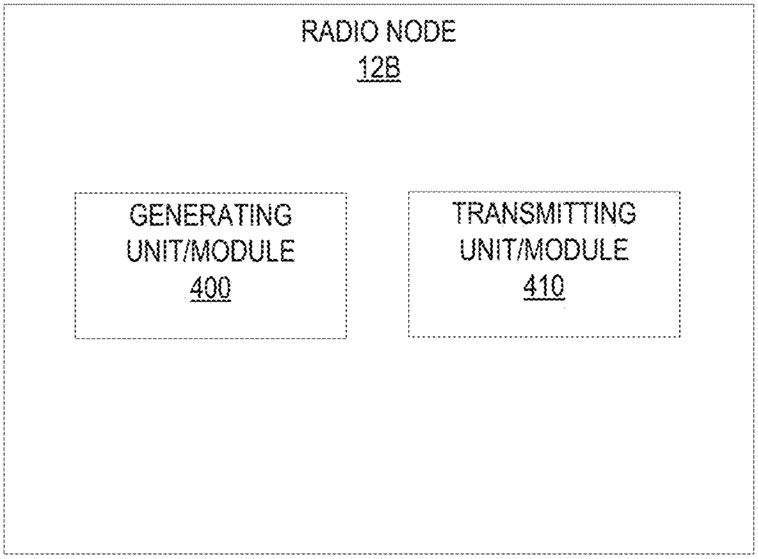
FIG. 13 is a block diagram of a radio node according to other embodiments.

FIG. 13 illustrates a radio node 12 implemented in the form of a radio node 12B in accordance with one or more other embodiments. As shown, the radio node 12B implements various functional means, units, or modules, e.g., via the processing circuitry 300 in FIG. 12 and/or via software code. These functional means, units, or modules, e.g., for implementing the method in FIG. 10, include for instance a generating unit or module 400 for generating explicit signaling that is associated with a first part 16 of system information and that indicates a sequence 24 with which a second part 20 of system information is to be demodulated or descrambled. Also included is a transmitting unit or module 410 for transmitting the explicit signaling over a signaling channel 25.

Similarly, a wireless communication device 14 as described above may perform any of the processing herein by implementing any functional means or units. In one embodiment, for example, the wireless communication device 14 comprises respective circuits or circuitry configured to perform the steps shown in FIG. 11. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 14:
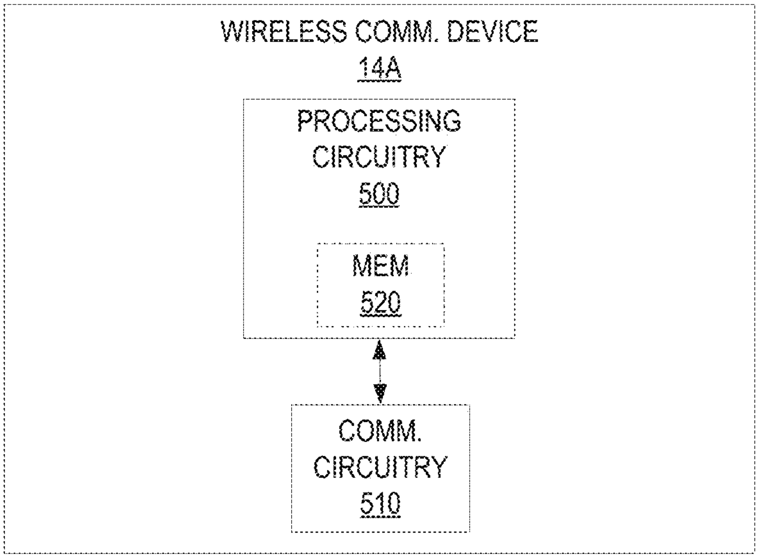
FIG. 14 is a block diagram of a wireless communication device according to some embodiments.

FIG. 14 illustrates a wireless communication device 14 implemented in the form of a wireless communication device 14A in accordance with one or more embodiments. As shown, the wireless communication device 14A includes processing circuitry 500 and communication circuitry 510. The communication circuitry 510 is configured to transmit and/or receive information to and/or from one or more other nodes, e.g., via any communication technology. The processing circuitry 500 is configured to perform processing described above, e.g., in FIG. 11, such as by executing instructions stored in memory 520. The processing circuitry 500 in this regard may implement certain functional means, units, or modules.

Figure 15:
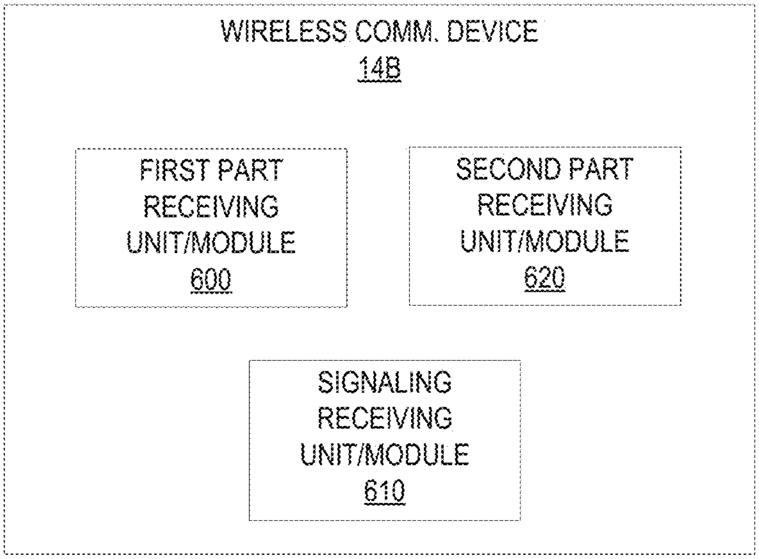
FIG. 15 is a block diagram of a wireless communication device according to other embodiments.

FIG. 15 illustrates a wireless communication device 14 implemented in the form of a wireless communication device 14B in accordance with one or more other embodiments. As shown, the wireless communication device 14B implements various functional means, units, or modules, e.g., via the processing circuitry 500 in FIG. 14 and/or via software code. These functional means, units, or modules, e.g., for implementing the method in FIG. 11, include for instance a first part receiving unit or module 600 for receiving, over a first channel 18, a first part 16 of system information. Also included is a signaling unit or module 610 for receiving, over a signaling channel 25, explicit signaling that is associated with the first part 16 and that indicates a sequence 24 with which the wireless communication device 14 is to demodulate or descramble a second part 20 of system information. Further included is a second part receiving unit or module 620 for receiving the second part 20 of system information over a second channel 22, by demodulating or descrambling the second part 20 using the indicated sequence 24.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless communication device for receiving system information for a wireless communication system in parts, the method comprising:

receiving, over a first channel, a first part of system information;

receiving, over a signaling channel, explicit signaling that is associated with the first part and that indicates a second demodulation reference signal sequence with which the wireless communication device is to demodulate a second part of system information, wherein the second demodulation reference signal sequence with which the wireless communication device is to demodulate the second part of system information is different than a first demodulation reference signal sequence used for demodulating the first part of system information; and receiving the second part of system information over a second channel, by demodulating the second part using the indicated second demodulation reference signal sequence.

2. The method of claim 1, wherein the explicit signaling is included in the first part of system information.

3. The method of claim 1, wherein the first channel and the signaling channel are the same channel.

4. The method of claim 1, wherein receiving the first part of system information comprises demodulating the first part of system information using the first demodulation reference signal sequence.

5. The method of claim 1, wherein the first part of system information comprises a master information block and the second part of system information comprises a system information block.

6. The method of claim 1, wherein the explicit signaling includes one or more information elements that indicate the second demodulation reference signal sequence with which the wireless communication device is to demodulate the second part of system information.

7. The method of claim 1, wherein the first channel and the signaling channel are the same channel, wherein the first part of system information comprises a master information block, wherein the second part of system information comprises a system information block, and wherein the explicit signaling is included in the master information block, such that the method comprises:

receiving, over the first channel, the master information block that indicates the second demodulation reference signal sequence with which the wireless communication device is to demodulate the system information block; and receiving the system information block over the second channel, by demodulating the system information block using the indicated second demodulation reference signal sequence.

8. A method implemented by a radio node configured for use in a wireless communication system in which system information is transmitted in parts, the method comprising:

generating explicit signaling that is associated with a first part of system information and that indicates a second demodulation reference signal sequence with which a second part of system information is to be demodulated, wherein the second demodulation reference signal sequence is different than a first demodulation reference signal sequence with which the first part of system information is to be demodulated; and transmitting the explicit signaling over a signaling channel.

9. The method of claim 8, wherein the explicit signaling is included in the first part of system information.

10. The method of claim 8, wherein the signaling channel is transmitted over the same channel as a channel over which the first part of system information is transmitted.

11. The method of claim 8, wherein the first part of system information comprises a master information block and the second part of system information comprises a system information block.

12. The method of claim 8, wherein the explicit signaling includes one or more information elements that indicate the second demodulation reference signal sequence with which the wireless communication device is to demodulate the second part of system information.

13. The method of claim 8, wherein the signaling channel is a first channel over which the first part of system information is transmitted, wherein the first part of system information comprises a master information block, wherein the second part of system information comprises a system information block, and wherein the explicit signaling is included in the master information block such that the method comprises:

transmitting, over the first channel, the master information block that indicates the second demodulation reference signal sequence with which the wireless communication device is to demodulate the system information block; and transmitting, over a second channel, the system information block to be demodulated using the indicated second demodulation reference signal sequence.

14. A wireless communication device for receiving system information for a wireless communication system in parts, the wireless communication device comprising:

a processor and a memory, the memory containing instructions executable by the processor whereby the wireless communication device is configured to:

receive, over a first channel, a first part of system information;

receive, over a signaling channel, explicit signaling that is associated with the first part and that indicates a second demodulation reference signal sequence with which the wireless communication device is to demodulate a second part of system information, wherein the second demodulation reference signal sequence with which the wireless communication device is to demodulate the second part of system information is different than a first demodulation reference signal sequence used for demodulating the first part of system information; and receive the second part of system information over a second channel, by demodulating the second part using the indicated second demodulation reference signal sequence.

15. The wireless communication device of claim 14, wherein the explicit signaling is included in the first part of system information.

16. The wireless communication device of claim 14, wherein the first channel and the signaling channel are the same channel.

17. The wireless communication device of claim 14, wherein the memory contains instructions executable by the processor whereby the wireless communication device is configured to receive the first part of system information by demodulating the first part of system information using the first demodulation reference signal sequence.

18. The wireless communication device of claim 14, wherein the first part of system information comprises a master information block and the second part of system information comprises a system information block.

19. The wireless communication device of claim 14, wherein the explicit signaling includes one or more information elements that indicate the second demodulation reference signal sequence with which the wireless communication device is to demodulate the second part of system information.

20. The wireless communication device of claim 14, wherein the first channel and the signaling channel are the same channel, wherein the first part of system information comprises a master information block, wherein the second part of system information comprises a system information block, and wherein the explicit signaling is included in the master information block, such the memory contains instructions executable by the processor whereby the wireless communication device is configured to:

receive, over the first channel, the master information block that indicates the second demodulation reference signal sequence with which the wireless communication device is to demodulate the system information block; and receive the system information block over the second channel, by demodulating the system information block using the indicated second demodulation reference signal sequence.

21. A radio node for use in a wireless communication system in which system information is transmitted in parts the radio node comprising:

a processor and a memory, the memory containing instructions executable by the processor whereby the wireless communication device is configured to:

generate explicit signaling that is associated with a first part of system information and that indicates a second demodulation reference signal sequence with which a second part of system information is to be demodulated, wherein the second demodulation reference signal sequence is different than a first demodulation reference signal sequence with which the first part of system information is to be demodulated; and transmit the explicit signaling over a signaling channel.

22. The radio node of claim 21, wherein the explicit signaling is included in the first part of system information.

23. The radio node of claim 21, wherein the signaling channel is transmitted over the same channel as a channel over which the first part of system information is transmitted.

24. The radio node of claim 21, wherein the first part of system information comprises a master information block and the second part of system information comprises a system information block.

* * * * *